(12) United States Patent
Gallo

(10) Patent No.: US 10,436,994 B2
(45) Date of Patent: Oct. 8, 2019

(54) OPTICAL FIBER CABLE

(71) Applicant: CORNING OPTICAL COMMUNICATIONS LLC, Hickory, NC (US)

(72) Inventor: Emanuela Gallo, Berlin (DE)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/794,170

(22) Filed: Oct. 26, 2017

(65) Prior Publication Data

US 2018/0059345 A1    Mar. 1, 2018

Related U.S. Application Data

(63) Continuation of application No. PCT/US2016/027230, filed on Apr. 13, 2016.

(30) Foreign Application Priority Data

Apr. 27, 2015    (EP) .................................... 15165190

(51) Int. Cl.
*G02B 6/44*    (2006.01)
*H01B 7/295*    (2006.01)
(Continued)

(52) U.S. Cl.
CPC ......... *G02B 6/443* (2013.01); *G02B 6/02395* (2013.01); *G02B 6/4436* (2013.01);
(Continued)

(58) Field of Classification Search
None
See application file for complete search history.

(56) References Cited

U.S. PATENT DOCUMENTS 3,300,339 A    1/1967    Perri et al.
3,596,940 A    8/1971    Horwitt et al.
(Continued)

FOREIGN PATENT DOCUMENTS

CN    102585347 B    12/2013
CN    103435897 A    12/2013
(Continued)

OTHER PUBLICATIONS

Chen et al; "Synergistic Effects of Hydroxy Silicone Oil on Intumescent Flame Retardant Polypropylene System"; Fire Safety Journal; vol. 44 Issue 8, pp. 1010-1014; 2009.
(Continued)

*Primary Examiner* — Rhonda S Peace
(74) *Attorney, Agent, or Firm* — William D. Doyle

(57) ABSTRACT

An optical fiber cable includes a plurality of optical fibers and at least one tubular jacketing element surrounding the plurality of optical fibers. The jacketing element has a jacketing material containing at least a first ingredient being a thermoplastic polymer, a second ingredient being an intumescent material capable of releasing gas, under the influence of heat, for generating a foam, and a third ingredient being a stiffening agent capable of decomposing, under the influence of heat, with formation of a glass and/or of a ceramic material for stiffening the foam.

25 Claims, 5 Drawing Sheets

(51) Int. Cl.
   *H01B 7/29* (2006.01)
   *G02B 6/02* (2006.01)

(52) U.S. Cl.
   CPC ............ *G02B 6/4486* (2013.01); *H01B 7/292* (2013.01); *H01B 7/295* (2013.01); *G02B 6/4413* (2013.01); *G02B 6/4434* (2013.01)

(56) References Cited

U.S. PATENT DOCUMENTS

| | | | |
|---|---|---|---|
| 4,328,139 A | 5/1982 | Simons | |
| 4,575,184 A | 3/1986 | Ueno et al. | |
| 5,202,946 A | 4/1993 | Hardin et al. | |
| 5,286,775 A * | 2/1994 | Bandyopadhyay | C08K 3/32 524/101 |
| 6,998,536 B2 | 2/2006 | Barusseau et al. | |
| 7,045,080 B1 | 5/2006 | Youngs | |
| 7,438,748 B2 * | 10/2008 | Cogen | B82Y 30/00 106/15.05 |
| 7,986,863 B2 * | 7/2011 | Fruhnert | G02B 6/4436 385/100 |
| 8,409,479 B2 | 4/2013 | Alexander et al. | |
| 9,175,223 B2 | 11/2015 | Zhu et al. | |
| 9,297,975 B2 * | 3/2016 | Blazer | B29D 11/00663 |
| 9,389,387 B2 * | 7/2016 | Blazer | G02B 6/4403 |
| 9,594,226 B2 * | 3/2017 | Blazer | G02B 6/4432 |
| 9,690,062 B2 * | 6/2017 | Hurley | G02B 6/4436 |
| 9,784,935 B2 * | 10/2017 | Bringuier | G02B 6/4436 |
| 2003/0031818 A1 | 2/2003 | Horacek | |
| 2003/0178220 A1 | 9/2003 | Barusseau et al. | |
| 2006/0068201 A1 | 3/2006 | Alexander et al. | |
| 2006/0151758 A1 | 7/2006 | Reyes | |
| 2007/0010615 A1 * | 1/2007 | Cogen | C08L 23/0815 524/515 |
| 2009/0069480 A1 | 3/2009 | Zangara et al. | |
| 2010/0101822 A1 * | 4/2010 | Bunker | C08F 255/02 174/110 SR |
| 2011/0097047 A1 * | 4/2011 | Fruhnert | G02B 6/4436 385/100 |
| 2011/0311830 A1 | 12/2011 | Wade | |
| 2012/0063730 A1 * | 3/2012 | Gagnon | G02B 6/4436 385/100 |
| 2012/0224818 A1 | 9/2012 | Karayianni | |
| 2013/0170800 A1 | 7/2013 | Consonni et al. | |
| 2014/0133812 A1 * | 5/2014 | Kimura | G02B 6/443 385/100 |
| 2015/0060106 A1 | 3/2015 | Polasky | |
| 2015/0131952 A1 | 5/2015 | Gallo et al. | |
| 2016/0306129 A1 * | 10/2016 | Hurley | G02B 6/4434 |
| 2017/0153389 A1 * | 6/2017 | Chen | G02B 6/02395 |
| 2018/0059345 A1 * | 3/2018 | Gallo | G02B 6/443 |

FOREIGN PATENT DOCUMENTS

| | | |
|---|---|---|
| EP | 0484958 A2 | 5/1992 |
| JP | 5747764 B3 | 7/2015 |

OTHER PUBLICATIONS

European Patent Application No. 15165190.8 Search Report dated Oct. 15, 2016; 8 Pages; Patent European Office.

International Search Report and Written Opinion of the International Searching Authority; PCT/US2016027230 dated Jul. 6, 2016; 11 Pages; ISA/US Commissioner for Patents.

Mansouri et al; "Pyrolysis Behaviour of Silicone-Based Ceramifying Composites"; Materials Science and Engineering: A; vol. 425, Issue 1-2 pp. 7-14; 2006.

Marosi et al; "Ceramic Precursor in Flame Retardant Systems"; Polymer Degradation and Stability; vol. 7, Issue 2, pp. 259-265; 2002.

* cited by examiner

OPTICAL FIBER CABLE

PRIORITY APPLICATIONS

This application is a continuation of International Application No. PCT/US16/27230, filed on Apr. 13, 2016, which claims the benefit of priority to European Application No. 15165190.8, filed on Apr. 27, 2015, both applications being incorporated herein by reference.

BACKGROUND

Optical fiber cables comprise optical fibers for transmission of optical signals and further comprise jacketing elements enclosing the optical fibers. For instance, buffer tubes surround a respective number of optical fibers, and the cable jacket surrounds a plurality of buffer tubes. The cable jacket and the buffer tubes are usually formed of synthetic materials.

For indoor applications, fire protection or at least fire resistance of optical fiber cables is vital, particularly since an optical fiber cable, once having caught fire, bears the risk of propagating the fire from one spot in a building to further rooms or areas. Accordingly, jacketing elements such as the cable jacket or the buffer tubes should be designed to be fire-resistant or even self-extinguishable.

One conventional way of designing the fire-resistant material of jacketing elements of optical fiber cables is to use an intumescent additive, that is a component that decomposes and/or reacts with the formation of a foam containing a gas, when subjected to heat in case of fire. Such intumescent agents are already known; in polymer-based sheathing materials of jacketing elements they produce a carbonaceous foam when ignited, thereby providing thermal protection of optical fibers, pushing back the fire front and spreading around the section of the fire cable exposed to the flames and/or heat. As long as the optical cable is surrounded by the carbonaceous foam and gas formation or foam formation is not yet exhausted, fire protection is maintained.

In case of fire, however, fire often produces high winds. Furthermore, water sprayed by the fire service or by water nozzles at the ceiling may wash away the protecting foam from the fiber cable, thus bearing the risk of re-ignition as long as the fire is not extinguished completely throughout the building. Furthermore, any contact of the heated cable with other objects or people may locally damage the foamed protection layer, thus again exposing the cable core.

It is the object of the present application to provide an optical fiber cable having improved fire resistance.

SUMMARY

In one embodiment, an optical fiber cable comprises a plurality of optical fibers and at least one tubular jacketing element surrounding the plurality of optical fibers, wherein the jacketing element comprises a jacketing material containing at least the following ingredients mixed with one another: a first ingredient being a thermoplastic polymer, a second ingredient being an intumescent material capable of releasing gas, under the influence of heat, for generating a foam, and a third ingredient being a stiffening agent capable of decomposing, under the influence of heat, with formation of a glass and/or of a ceramic material for stiffening the foam.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

The features and advantages disclosed herein are apparent from the following description taken in conjunction with the accompanying drawings in which.

DETAILED DESCRIPTION

Figure 1:
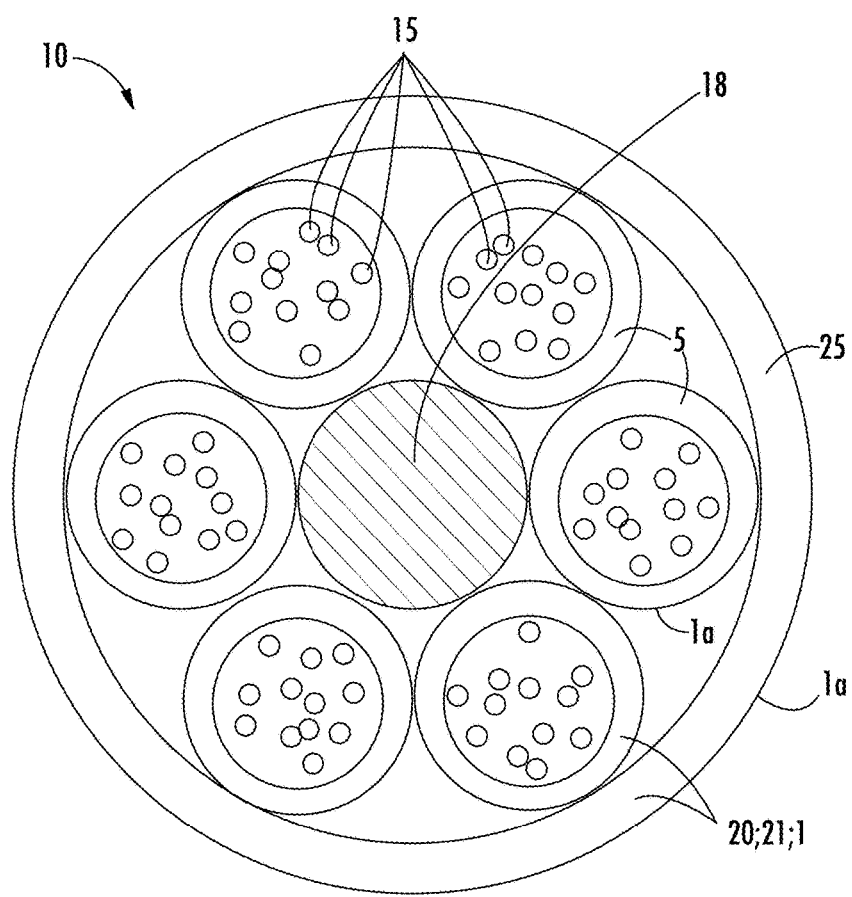
FIG. 1 shows an exemplary optical fiber cable in cross-sectional view.

According to aspects of the present disclosure, improved fire resistance of a jacketing element of an optical fiber cable may be provided through a jacketing material of the jacketing element, wherein the jacketing material comprises a stiffening agent capable of decomposing, under the influence of heat, with formation of a glass and/or with formation of a ceramic material. In addition to the stiffening agent, the jacketing element may further comprise, for example, an intumescent material and a thermoplastic polymer. Thereby, the foam formed with means of the intumescent material, in case of fire, is stiffened or hardened, due to the formation of the glass or ceramic material formed as a result of the stiffening agent. Mechanical rigidity and robustness may thus be imparted to the foam, with the stiffened/hardened foam forming a mechanically resistant protection layer around the optical fiber cable. The stiffening agent is a precursor of a glass or of a ceramic material, such as a precursor of silicon dioxide, of a phosphate glass or of another glass or ceramic material. The glass or ceramic forms a molecular and/or structural network, which is a rigid skeleton structure or structural network that stiffens and supports the foam. The structurally reinforced network obtained thereby is mechanically resistant to fire-induced winds and to other mechanical influences which might deform, wash away, or otherwise locally remove the foam from around the optical fiber cable core. The structurally reinforced foam thus forms a stable and persistent protection layer, significantly increasing fire resistance of the optical fiber cable.

In accordance with aspects of the present disclosure, the hardening or stiffening agent may be blended with the other materials of the jacketing element to form a composite material of the jacketing element. The composite material is capable of extrusion and may be used to form various components of a fiber optic cable assembly, including buffer tubes and/or cable jackets of increased fire resistance.

Preferably, the stiffening agent is an organically-reactive, stiffening, agent (i.e., organo-reactive). For example, organo-silicon compounds or organo-phosphorous compounds may be used as the organic substance which decomposes, under the influence of heat, with the formation of a glass and/or of a ceramic. As the glass or ceramic generated when the selected organic stiffening agent is heated by fire-induced heat, for example, silicon dioxide or a phosphor oxide may be formed.

The glass or ceramic precursor used as the stiffening agent for the generation of the structurally reinforced network in the burning jacketing material does not need to be provided as an inorganic ingredient. The organic stiffening agent can be an organic substance, which may improve mechanical elasticity and flexibility of the optical cable sheathing due to the absence of any inorganic material in the unignited, pristine state of the jacketing element. As a further benefit, since the organic stiffening agent easily reacts with the thermoplastic polymer, a comparatively small quantity of the organic stiffening agent may suffice, such as less than 10% per weight of the jacketing material. Due to the organic stiffening agent, the jacketing material is capable of forming a structural network which provides for rigidity and mechanical stability of the network-reinforced foam formed during heating and/or exposure to fire, whereas at room temperature, before being ignited, the jacketing material of the jacketing element maintains its elasticity.

FIG. 1 shows a conventional optical fiber cable in a cross-sectional view, in the direction transverse to the axial direction of the cable. The optical fiber cable 10 comprises a plurality of optical fibers 15. The optical fibers 15 are surrounded by at least one jacketing element 20; such as, for example, by buffer tubes 5 and/or by a cable jacket 25. In accordance with aspects of the present disclosure, twelve optical fibers 15 may be arranged in and surrounded by a respective buffer tube 5, and a plurality of six buffer tubes 5 may be surrounded by the cable jacket 25. Between the buffer tubes 5, a strengthening element 18 for mechanically stabilizing the cable against tensional forces, especially in an axial direction, may be provided at the center of the optical fiber cable 10. The jacketing material 21 of the jacketing element 20 may be a compound body 1, which is a composite material that is an extrudate gained by an extrusion process.

When an optical fiber cable 10 as depicted in FIG. 1 is exposed to a fire or to fire-induced heat inside a building, the material of the jacketing elements 20 are first exposed to heat and/or flames. According to aspects of the present disclosure, the material 21 of the jacketing element 20 may be designed such that it more reliably blocks heat and/or prevents fire from approaching the cable core. Due to the intumescent material, the jacketing material 21 forms a carbonaceous rigid foam. In those regions of the jacketing material 21 closest to the ambient atmosphere, particular at the outer circumferential surface of the jacketing element 20, oxygen from the ambient air penetrates the foam, thus forming a char foam layer of char foam. At the same time, the intumescent additive decomposes and thereby releases gases that expand the carbonaceous char. In addition, according to aspects of the present disclosure, the stiffening agent reacts with the carbonaceous char and converts to a glass and/or ceramic material, thereby forming a three-dimensional, structurally reinforced network for mechanically stabilizing the carbonaceous foam and/or the char foam layer. Due to the structurally reinforced network thus formed, the expanded foam maintains its shape after expansion, even in the presence of high fire-induced winds or in the presence of other mechanical influences. For instance, the structurally reinforced network formed of the foam supported by the glass or ceramic material can no longer be washed away by water sprayed by the fire service.

Figure 2:
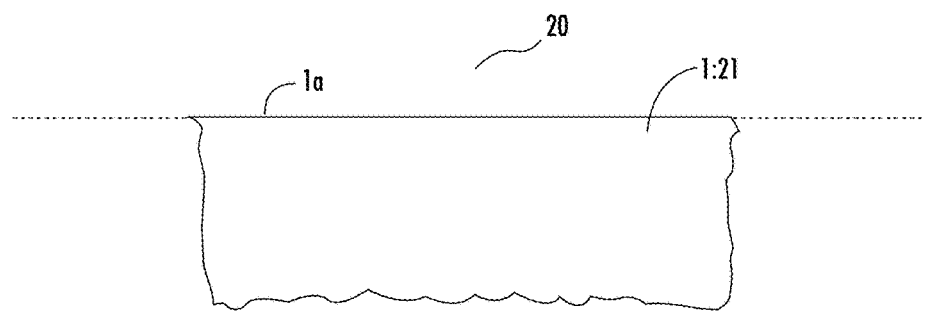
FIG. 2 shows a jacketing material of a section of a jacketing element in pristine condition, before exposure to fire-induced heat.

FIG. 2 shows a sectional view of region of a jacketing element 20 close to its outer surface 1a. The jacketing element 20, which may be a buffer tube 5 or the cable jacket 25, for example, may be formed as a compound body 1, such as an extrudate. The outer surface 1a represented by the straight, upper line in FIG. 2 may, for example, be a portion of the cylindrical circumferential surface. The dashed line extending along the axial direction (horizontally in FIG. 2) of the jacketing element 20, indicates the initial radial position of the circumferential outer surface 1 of the cable jacket 25 or buffer tube 5.

Figure 3:
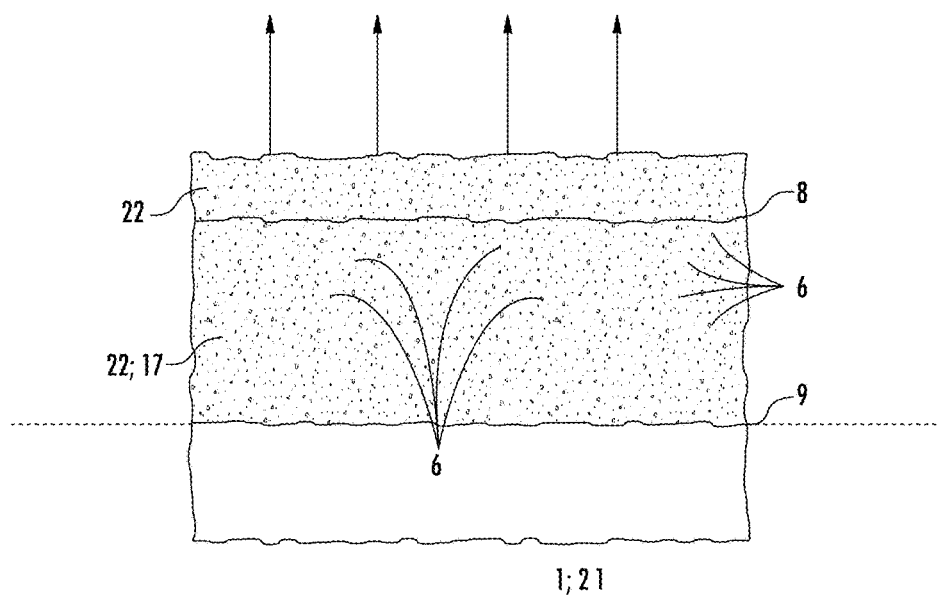
FIG. 3 shows the jacketing material of FIG. 2 transforming when exposed to fire-induced heat.

FIG. 3 schematically shows the transformation of the jacketing material 21 of FIG. 2 in the presence of fire-induced heat. Due to the intumescent component comprised in the jacketing material 21, in regions close to the outer surface 1a the jacketing material 21 begins to expand due to the formation of a carbonaceous foam 17 containing a gas 6. The intumescent component is a blowing agent or spumific agent capable of releasing a gas 6 when heated. Since the gas 6 is trapped in the heated jacketing material 21, the jacketing material 21 increases in volume and thus expands in radially outside direction, thus forcing any flames and/or heat away from the core of the optical fiber cable and thus sealing any puncture or leakage in the tubular jacketing element 20.

FIG. 3 shows an intermediate state of the heat-induced transformation of the expanding jacketing material 21 of the jacketing element 20. The horizontal dashed line in FIG. 3 indicates the original position of the circumferential outer surface 1a of the jacketing element 21 as shown in FIG. 2. As apparent from FIG. 3, the circumferential surface of the transforming jacketing material 21 has expanded beyond its initial position and is about to expand further. The final expansion factor (not yet achieved in FIG. 3) may amount to, for example, 30 times the volume of the original, unconverted jacketing material, or even larger.

As further apparent from FIG. 3, an intumescent front 8 exists inside the jacketing material, which intumescent front 8 moves away from the inner burning front 9 where the unconverted jacketing material 21 begins to burn and/or expand. Laterally outside the burning front 9, a carbonaceous foam 17 is thus formed in which the gas 6 released by the intumescent material 12 is trapped. Furthermore, in those regions of the jacketing material closest to the exterior of the optical fiber cable, the jacketing material is exposed to oxygen from the ambient air, thus forming a layer of char foam 22 in the radially outermost region of the jacketing element 20. In this region, oxygen from the surrounding atmosphere is contained in the char foam 22.

The composite jacketing material 21 is chosen such that at the carbonacous foam 17, or at least the char foam 22 in regions closest to the expanding outer circumference of the optical cable, is mechanically or structurally reinforced, due to the co-generation of a network of a glass or of a ceramic in the composite jacketing material 21 by means of the stiffening agent. As a consequence, the foam 17; 22 is rendered persistent to outer mechanical influences, such as high winds, contact with sprayed or spilled water, or to mechanical contact with other objects. Even in the presence of such influences, the expanded and reinforced foam 17; 22 of the jacketing material will preserve its shape, thereby preventing and sealing any leakage in the expanded protection layer and formed by the stiffened foam; thus reliably protecting the cable core from being ignited. The optical fiber cable 10 provided with this new kind of composite jacketing material 21 is rendered fire-resistant or even self-extinguishable.

Figure 4:
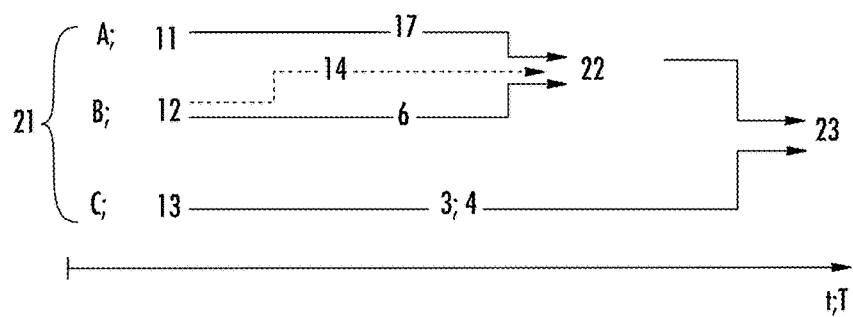
FIG. 4 schematically shows a first exemplary material composition of a jacketing material.

FIG. 4 schematically shows a first exemplary material composition of the jacketing material 21. The jacketing material 21 may be a compound material comprising three ingredients A, B, C. These ingredients may be the main ingredients or, alternatively, may be compounded with further ingredients. Not each of these ingredients A, B, C needs to be a main ingredient in terms of quantity. However, at least these three ingredients are provided in the jacketing material 21 shown in FIG. 4. According to FIG. 4, the jacketing material 21 comprises, as the first ingredient A, a thermoplastic polymer 11 which serves as a carbon source for the generation of a carbonaceous foam 17 and, following absorption of oxygen from the ambient air, of the carbonaceous, oxygen-containing layer of char foam 22. As the thermoplastic polymer 11, a poly-olefin, a polyurethane or engineering plastics such as polybutadiene terephthalate (PBT), for example, may be used. Further examples of thermoplastic polymers are poly-butadiene, polyester, polypropylene, or polyethylene. The particular polymer material may be chosen according to the needs regarding the desired extrusion temperature for forming the extrudate or compound body 1 constituting the jacketing element 20. Alternatively to engineering plastics, poly-olefins or polyurethanes, may be used as the thermoplastic polymer 11. Furthermore, a blend or mixture of these may be used as the thermoplastic polymer.

As the second ingredient B, the jacketing material 21 comprises an intumescent material 12 or component. The intumescent material 12 is a substance that is intumescent or spumific when heated, thus releasing gas and forming a foam. As the intumescent 12, expandable graphite may be used. Expandable graphite is obtained by treating graphite such that it absorbs a large amount of intercalated molecules. Normally, sulfuric acid is inserted into the graphite. Instead of expandable graphite, the jacketing material 21 may include another intumescent additive that exploits the synergism between nitrogen and phosphorus, for example. A combination of substances containing phosphorus and nitrogen may by chosen as the intumescent material 12 in order to be capable, under the influence of heat, of releasing nitrogen-based gases, i.e. gases containing nitrogen.

The intumescent material 12 may, for instance, comprise a phosphorus content of between 23% and 25% and/or a nitrogen content of between 18% and 20%. The bulk density of the intumescent material 12 may, for instance, be in the range between 0.4 g/cm3 and 0.8 g/cm3, preferably about 0.6 g/cm3. As the intumescent, for instance, Exolit OP 765 (Clariant) or Budit 3167 (Budenheim) may be used.

As the third ingredient C, the jacketing material 21 may comprise a stiffening agent 13 capable of decomposing, under the influence of heat, with formation of a glass and/or of a ceramic inorganic material. The stiffening agent 13 serves to stiffen, that is harden, the foam 17; 22 once formed due to the jacketing material expanding under the influence of fire-induced heat. The stiffening agent 13 preferably is an organically-reactive, i.e., an organo-reactive stiffening agent, thereby obviating the need of adding inorganic materials to 10 the jacketing material 21. As a consequence, elasticity and flexibility of the cable jacket 25 or buffer tube 5 is not impeded by the stiffening agent 13, since the organic stiffening agent does not convert into inorganic substances (ceramic or glass) except for as the result of fire. The organic substance used as the stiffening agent 13 may be an organo-silicon compound for forming silicon dioxide, such as siloxane, for instance. Alternatively, the stiffening agent may be an organo-phosphorous compound for forming a phosphorus-containing glass and/or ceramic when decomposing. For instance, organic precursors of phosphorus oxide (PxOy) may be used.

Beginning with the pristine composite jacketing material 21 containing these three components A, B, C, FIG. 4 schematically shows its transformation over time in a fire scenario. With increasing time t and thus with increasing temperature T, the intumescent material 12 starts generating the gas 6. The thermoplastic polymer 11, the intumescent component and the gas thus form a carbonaceous foam 17. In the outermost regions of the jacketing element 20 most exposed to the ambient air outside the cable, oxygen from the air is absorbed 25 by the carbonaceous foam 17, thus forming a layer of char foam 22. The carbonaceous foam 17 and the char foam 22, due to the gas 6 trapped therein, provide thermal insulation of the cable core. The gas 6 released by the intumescent material 12 may be nitrogen, ammonia, or oxygen, for instance. The expansion factor of the heated jacketing material, due to the intumescent material 12 provided therein, may be up to 30 or more times the initial volume of the jacketing material. Accordingly, the density of the transformed, expanded jacketing material may be 1/30 of its initial density, or even less.

Optionally, as indicated by the dashed line in FIG. 4, the intumescent material 12 may be chosen such that it further generates, when or before releasing the gas 6, a catalyst 14 promoting the formation of the char foam 22. The catalyst 14 formed thereby may particularly be an inorganic acid, such as a phosphorous-based acid. For instance, a phosphinate, a phosphide, a phosphonate or PhosLite or another phosphorous-containing material may be formed and/or exploited as a precursor material for the catalyst.

Over time, that is with rising temperature as indicated in FIG. 4, the stiffening agent 13, i.e. the third ingredient C, may be converted or at least partially converted into a glass or a ceramic. Whether a glass 3 or a ceramic 4 is formed depends on the temperature rise, the duration of the impact of fire and/or heat, and on the particular kind of stiffening agent 13 chosen. Preferably, the stiffening agent 13 may be an organic substance, thus preserving elasticity of the jacketing element 20 until, when an actual fire incident occurs, glass formation and/or ceramic formation starts to evolve.

Due to the formation of the glass 3 and/or of the ceramic material 4, the carbonaceous foam 17 and/or the char foam 22 is structurally reinforced, thus obtaining a structurally reinforced network 23 in those regions of the jacketing element 20 in which glass formation and/or ceramization has already occurred. Once the glass-converted or ceramified structurally reinforced network 23 is formed in the jacketing material 21, the jacketing material 21 is too stiff and resistant to be removed from the cable core, distorted or displaced by mechanical forces such as contact with other objects. Additionally, the jacketing material 21 can no longer be blown away by fire-induced winds or washed away by the impact of water. Accordingly, due to the structurally reinforced network 23 of ceramic or glass formed in the jacketing material 21, the jacketing material 21 is hardened or stiffened in at least those regions where the carbonaceous foam 17 and especially the char foam 22 has already been generated. Despite the circumstance that the now structurally reinforced jacketing material 20 is a foam of low density, the jacketing material nonetheless is mechanically reinforced due to the glass component or ceramic component formed therein.

Figure 5:
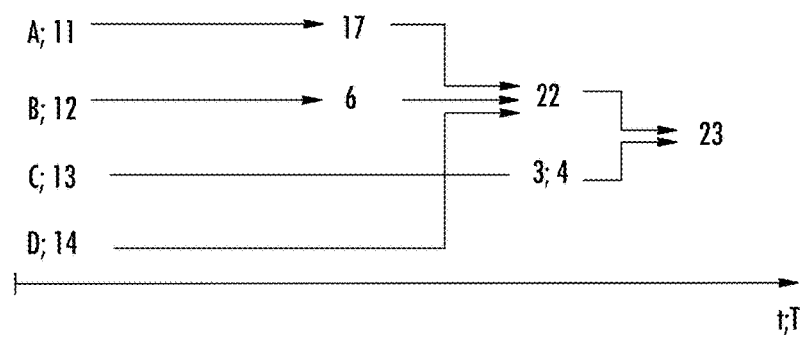
FIG. 5 shows an alternative, second exemplary material composition of a jacketing material.

FIG. 5 schematically shows another exemplary material composition of the jacketing material 21, in accordance with yet other aspects of the present disclosure. In contrast to FIG. 4, FIG. 5 illustrates a catalyst 14 or catalyst precursor which may be provided, as a fourth ingredient D, in the pristine material composition of the jacketing material 21, rather than only being formed in case of fire when the intumescent material 12 is converted into a foam. Accordingly, catalyzing of the formation of the carbonaceous foam 17 will start earlier in time during the evolution of a fire, i.e. at lower temperatures T. The further processes in FIG. 5 are analogous to those in FIG. 4 described above. Both figures are merely schematic. In particular, the reactions indicated by arrows will actually interact and overlap in time, that is during temperature increase. Moreover, the progress of the individual conversion steps or transformation steps depend on the position of the local region of the jacketing element considered (see FIGS. 2 and 3), including the radial distance of the jacketing element from the cable core and especially the distance from the circumferential outer surface 1a.

The jacketing material 21 may exclusively consist of those ingredients shown in FIG. 4 or 5, respectively, with no further ingredient existing in addition. The jacketing material 21 may comprise a content of thermoplastic polymer 11 of between 60% and 90%. The jacketing material 21 may comprise a content of intumescent material 12 of between 10% and 30%, preferably 20% to 30%. The jacketing material 21 may further comprise a content of the stiffening agent 13 of between 1% and 10%, preferably 2% to 5%. As disclosed herein, all numerical values and ranges for proportions of individual components or compounds in the material composition are in percent by weight. The above numerical ranges may hold for jacketing material compositions with or without further ingredients.

As a further component optionally contained in the jacketing materials of FIG. 4 or 5, for instance a smoke-suppressing agent may be provided, such as a borate. The smoke-suppressing agent may be provided at an amount of between 5% and 10% by weight.

The jacketing material composition 21 described hereinabove may be used for forming the cable jacket 25 and/or the buffer tubes 5. For instance, a cable jacket 25 surrounding a cable core may be formed of the jacketing material 21. The cable jacket 25 may have a cross-sectional diameter of between 2 mm and 20 mm and a thickness of between 0.1 mm and 3 mm, for instance. Alternatively, buffer tubes may be formed of the jacketing material 21.

The jacketing material 21 of the respective jacketing element 20 preferably is an extrudate, which is a product of a plastic extrusion process, in which the components A, B, C, and, D in the case of FIG. 5, as well as any further components, for the jacketing material 21 are mixed and extruded by means of an extruder. Thereby, the stiffening agent 13 may be compounded, as a powder or as pellets, and combined with the thermoplastic polymer 11, the intumescent material 12 and any further optional components.

Any conventional plastic extrusion compounder may be used for mixing together the polymer matrix, the intumescent additive and the pre-ceramic or pre-glass-filler together. The loading of the extruder may be chosen between 20% and 40%. For instance, a co-rotated twin screw extruder such as TEX28V with twelve blocks and eleven zones and with a screw diameter of 28 mm and a length of 42 mm may be used. A twin screw side feeder with co-rotation cylinders and 28 mm diameter may be used to feed the different additives, which may, for example, be in the form of powders or pellets, into the extruder. Preferably, the additives, e.g., the intumescent material 12 and the stiffening agent 13, are premixed before being fed into the extruder. They may be fed into the extruder, as pellet materials, at 300 rpm, thus producing a torque percentage ranging between 30% and 50%. The feeding rate may be chosen as 2 kg/h for pellets (ingredient A) and 1.33 kg/h for powder additives (ingredients B and C), for example. The final extrudate comprising the compounded ingredients of the jacketing material 21 may be cooled in a water-cooling bath, and a vacuum pump may be applied in order to remove water from the extrudate before pelletizing the extrudate using a strand cutter machine. Regarding the barrel temperature profile, the extruder temperature profile may, for instance, be chosen to be 150° C. in zones 1 and 2 and 190° C. in zones 3 to 10, with finally 180° C. for the dye at the extruder outlet. These numerical values are only exemplary; the extruder temperature may be different and may be chosen depending on the thermoplastic polymer used.

Hereinbelow, some test results regarding the flammability properties of an exemplary jacketing material are described with reference to FIGS. 6 to 8. The jacketing material 21 may comprise a thermoplastic polymer, an intumescent and a stiffening agent. As the intumescent material 12, Exolit® OP 765, a registered Trademark of Clariant, may be used, which comprises a phosphorus content of between 23% and 25% and a nitrogen content of between 18% and 20%, thus exploiting phosphorous and nitrogen synergism. The bulk density of the intumescent material 12 used was 0.6 g/cm3. As the thermoplastic polymer, polypropylen was used, and as the stiffening agent organically-reactive siloxane was used. The composite jacketing material comprised, in addition to the thermoplastic polymer 11 as the main ingredient, 30% of the intumescent material 12 and 5% of the stiffening agent. As a further ingredient, 5% of zinc borate was contained in the jacketing material, serving as a smoke-suppressing agent. The above composition is merely exemplary; as other thermoplastic polymers, organo-reactive stiffening agents and/or intumescent materials can likewise be used in accordance with aspects of the present disclosure.

The flammability properties were tested pursuant to the UL-94 test protocol, by using vertically mounted specimens of the size of 12 mm×3 mm×127 mm.

When exposed to a first application of a 1 KW Bunsen flame for ten seconds at the lower end of the test samples, the ceramifying formulation i.e. the ceramified mixture of the jacketing material 21 immediately self-extinguished and did not propagate the fire along the specimen. After a second flame application for another ten seconds, again self-extinction occurred. According to the UL-94 protocol, the ceramifying formulation is classified V-0. Only after a third additional flame application of a duration of 90 seconds, the specimen ignited. However, the flames again extinguished after only seven seconds. The test samples of the jacketing material passed a UL-94 test qualifying as V-0. During the flame exposition, a compact self-extinguished foamed char was formed on the surface of the jacketing element sample without further propagating the fire. No smoke production could be observed during the whole test. The flammability properties of the jacketing material under forced fire conditions were tested according to cone calorimeter measurements (ISO 5660) by using square samples of 100 mm×100 mm×3 mm horizontally fixed on a sample holder. When exposed to elevated temperatures, with an irradiation of 50 kW/m2, the jacketing material 21 showed the flammability properties described below and depicted in FIGS. 6 and 7.

Figure 6:
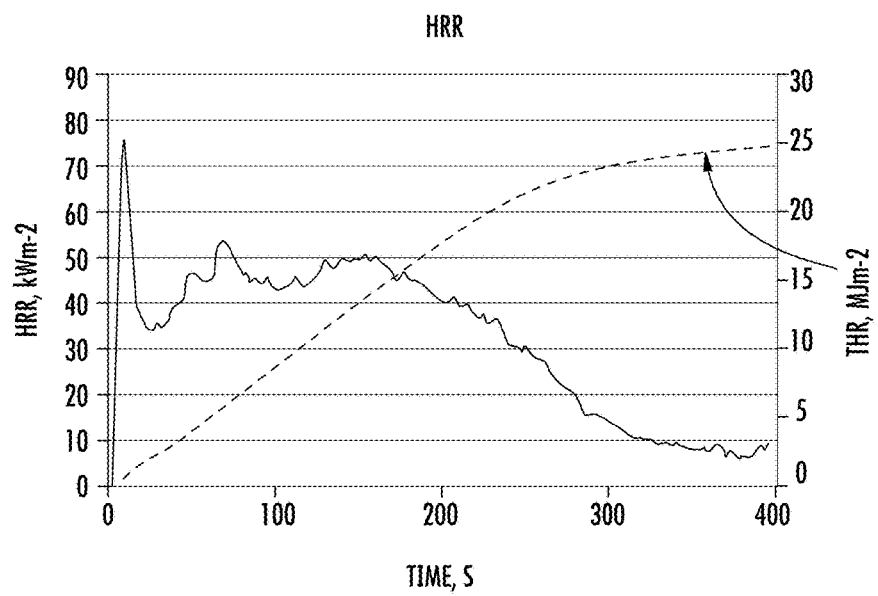
FIG. 6 shows the heat release rate and the total heat release measured over time for an exemplary jacketing material.
Figure 7:
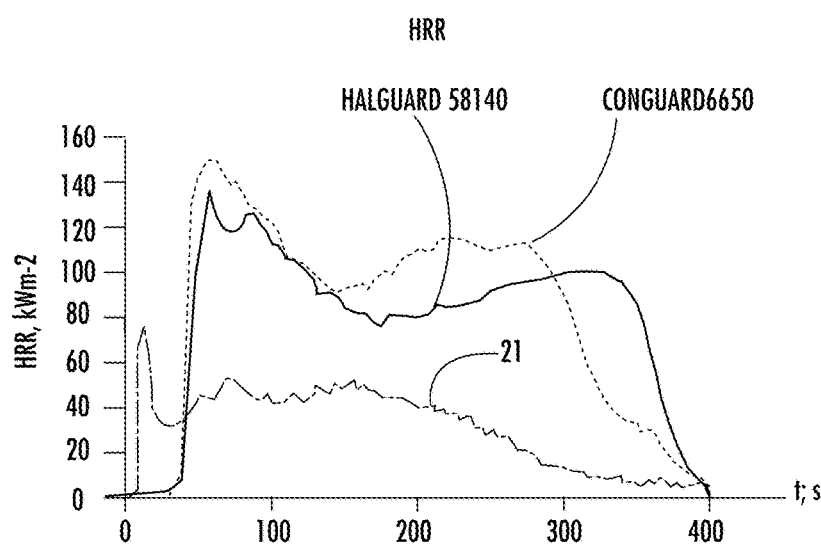
FIG. 7 shows the heat release rate measured over time for the jacketing material of FIG. 6 and two conventional jacketing materials.
Figure 8:
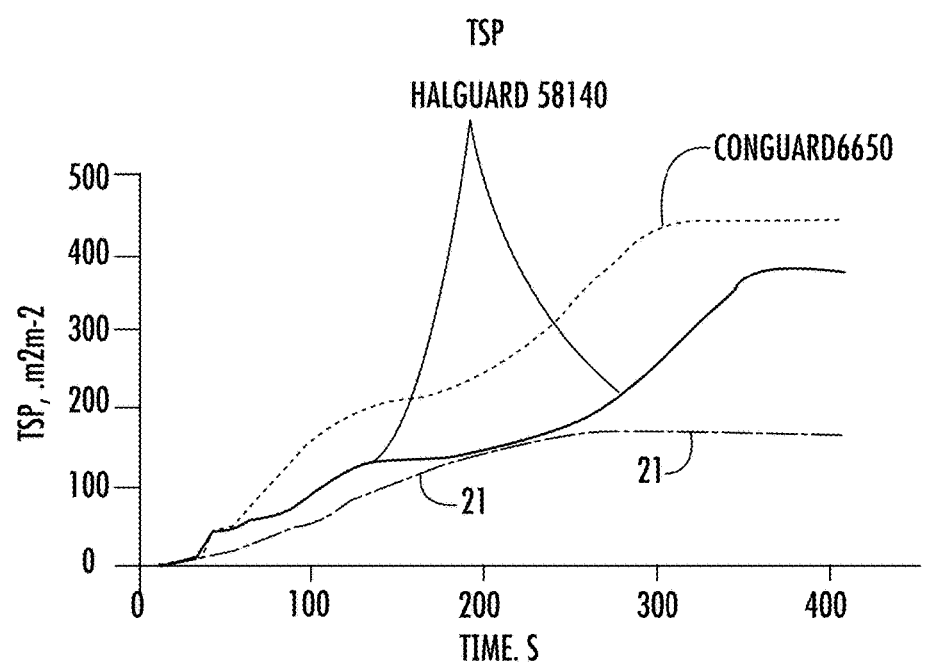
FIG. 8 shows the total smoke production over time for the three jacketing materials of FIG. 7.

In FIG. 6 and FIG. 7, the heat release rate (HRR) measured for the above formulation of the jacketing material 21 is depicted over time. Additionally, as shown in FIG. 6, the total heat release (integrated over time) is shown for this jacketing material 21. In FIG. 7, for comparison, test results of heat release rate measurements for two commercial, highly flame resistant jacketing materials, Halguard® 58140, a Trademark product of Teknor Apex, and CONGuard® 6650, a Trademark product of Condor Compounds, are illustrated.

As shown in FIGS. 6 and 7, the above jacketing material 21 of this application reached a very low heat release peak below 80 kW/m2, which indicated a strong fire-retardant effect. Compared to standard polyolefin compounds (with polyolefin HRR or PHRR in the range of 1400 kWm−2 to 1800 kWm−2), a reduction in the heat release rate (HRR) by more than 95% could be measured. The total heat release (THR) was decreased by 80% compared to standard polyolefin-based compounds, thus confirming efficient reduction of the total fire load and/or of the fire risk during combustion for the tested jacketing material 21 comprising a phosphorus-nitrogen-based intumescent additive as well as pre-ceramic additives in combination. The intumescent additive started foaming already during the first stage of combustion, building up a barrier layer on top of the materials, thus providing good protection against fire propagation. The presence of the comparatively small amount of pre-ceramic-based compounds helped cross-link the intumescent char, thus creating a strong three-dimensional cross-linked network. Combustion was stopped within 400 seconds. Finally, smoke production was reduced significantly, due to the formation of a compact and stable char with a tight internal structure, thus preventing fuel molecules from diffusing into the gas phase.

The fire performance of the test samples of jacketing material 21 was compared with two foremost, but conventional, commercially available fire-retardant, non-corrosive materials for cable jacketing application. The results are shown in FIGS. 7 and 8. FIG. 7 shows the heat release rate (HRR) and FIG. 8 shows the total smoke production (TSP). The results are shown for the test samples of the jacketing material 21 according to the above formulation, in comparison with the conventionally available products Halguard® 58140 and CONGuard® 6650. As apparent from FIGS. 7 and 8, the test samples showed significantly decreased amounts of heat release rate HRR (FIG. 7), being about 50% lower than for the conventional formulations, and more than 50% reduced total smoke production TSP (FIG. 8), especially after 250 seconds and later. Accordingly, the flammability properties of jacketing elements such as buffer tubes and cable jackets are significantly improved when using the jacketing material of the present application, which jacketing material includes a stiffening agent, in particularly an organic stiffening agent, as a glass precursor or pre-ceramic precursor, in combination with the thermoplastic polymer and the intumescent material.

Preferably, the jacketing material 21 and all ingredients thereof are non-halogenated; thus being non-poisonous for humans. Preferably, the optical fiber cable is an indoor cable.

What is claimed is:

1. An optical fiber cable comprising:
   a plurality of optical fibers and
   at least one tubular jacketing element surrounding the plurality of optical fibers,
   wherein the jacketing element comprises a thermoplastic jacketing material comprising the following ingredients mixed with one another:
   from 60% to 90% by weight of a first ingredient (A) being a thermoplastic polymer,
   from 10% to 30% by weight of a second ingredient (B) being an intumescent material capable of releasing gas, under the influence of heat, for generating a foam,
   from 1% to 10% by weight of a third ingredient (C) being a stiffening agent capable of decomposing, under the influence of heat, with formation of a glass and/or of a ceramic material for stiffening the foam; and
   up to 10% by weight of a fourth ingredient (D) being a smoke-suppressing agent
   wherein jacketing material is rated V-0 according to UL-94.

2. The optical fiber cable of claim 1, characterized in that the stiffening agent is an organo-reactive stiffening agent.

3. The optical fiber cable of claim 1, characterized in that the stiffening agent is a material that decomposes, under the influence of heat, with the formation of silicon dioxide.

4. The optical fiber cable of claim 1, characterized in that the stiffening agent is an organo-silicon-compound containing silicon.

5. The optical fiber cable of claim 4, wherein the organo-silicon-compound comprises siloxane.

6. The optical fiber cable of claim 1, characterized in that the jacketing material is an extrudate material in which the stiffening agent is compounded with the thermoplastic polymer and the intumescent material.

7. The optical fiber cable of claim 1, characterized in that the content of stiffening agent in the jacketing material is between 2% and 5% per weight.

8. The optical fiber cable of claim 1, characterized in that the intumescent material comprises expandable graphite.

9. The optical fiber cable of claim 1, characterized in that the intumescent material comprises a combination of substances containing phosphorus and nitrogen.

10. The optical fiber cable of claim 1, characterized in that the intumescent material comprises a substance capable of forming a foam by releasing, under the influence of heat, a gas containing nitrogen.

11. The optical fiber cable of claim 1, characterized in that the thermoplastic polymer comprises an engineering plastic, a poly-olefin, a polyurethane and/or a co-polymer.

12. The optical fiber cable of claim 1, characterized in that the thermoplastic polymer and/or the intumescent material decompose, under the influence of heat, with formation of a char foam and that the stiffening agent is a material that, under the influence of heat, decomposes and/or reacts with the char foam, thereby forming a structurally reinforced network for mechanically stabilizing the char foam, wherein the structurally reinforced network comprises the glass and/or the ceramic material.

13. The optical fiber cable of claim 1, characterized in that the optical fiber cable is an indoor cable and that the jacketing element consisting of the jacketing material is a buffer tube and/or a cable jacket.

14. The optical fiber cable of claim 1, wherein the smoke-suppressing agent comprises a borate.

15. The optical fiber cable of claim 1, wherein the jacketing material at least one of comprises a catalyst that promotes gas release for the formation of foam or forms, under the influence of heat, a catalyst that promotes gas release for the formation of foam.

16. The optical fiber cable of claim 15, characterized in that the catalyst is a phosphonate, a phosphinate, a phosphide, Phoslite or another agent capable of forming a phosphorus-based acid.

17. The optical fiber cable of claim 1, wherein the jacketing material has a peak heat release rate of below 80 $kW/m^2$.

18. The optical fiber cable of claim 1, wherein the total smoke production of the jacket material is no more than 200 $m^2/m^2$.

19. The optical fiber cable of claim 1, characterized in that the stiffening agent is a material that decomposes, under the influence of heat, with the formation of phosphorus oxide.

20. The optical fiber cable of claim 1, characterized in that the stiffening agent is an organo-phosphorus-compound containing phosphorus.

21. A method of manufacturing an optical fiber cable, the method comprising:
   mixing a jacket material comprising the following combination of ingredients mixed with one another:
      from 60% to 90% by weight of a first ingredient (A) being a thermoplastic polymer,
      from 10% to 30% by weight of a second ingredient (B) being an intumescent material capable of releasing gas, under the influence of heat, for generating a foam,
      from 1% to 10% by weight of a third ingredient (C) being a stiffening agent capable of decomposing, under the influence of heat, with formation of a glass and/or of a ceramic material for stiffening the foam; and
      up to 10% by weight of a fourth ingredient (D) being a smoke-suppressing agent;
   providing at least one optical fiber extending in a longitudinal direction; and
   extruding a tubular jacket comprising the jacket material to surround the at least one optical fiber;
   wherein the jacket material is rated V-0 according to UL-94.

22. The method of claim 21, characterized in that the stiffening agent is a material that decomposes, under the influence of heat, with the formation of silicon dioxide.

23. The method of claim 21, characterized in that the content of stiffening agent in the jacketing material is between 2% and 5% per weight.

24. The method of claim 21, characterized in that the intumescent material comprises expandable graphite.

25. The method of claim 21, characterized in that the intumescent material comprises a substance capable of forming a foam by releasing, under the influence of heat, a gas containing nitrogen.

* * * * *